Apr. 10, 1923.  1,451,058
R. P. SHATZKE
GRID PLATE FOR ELECTRIC CURRENT STORAGE BATTERIES
Filed Feb. 6, 1922
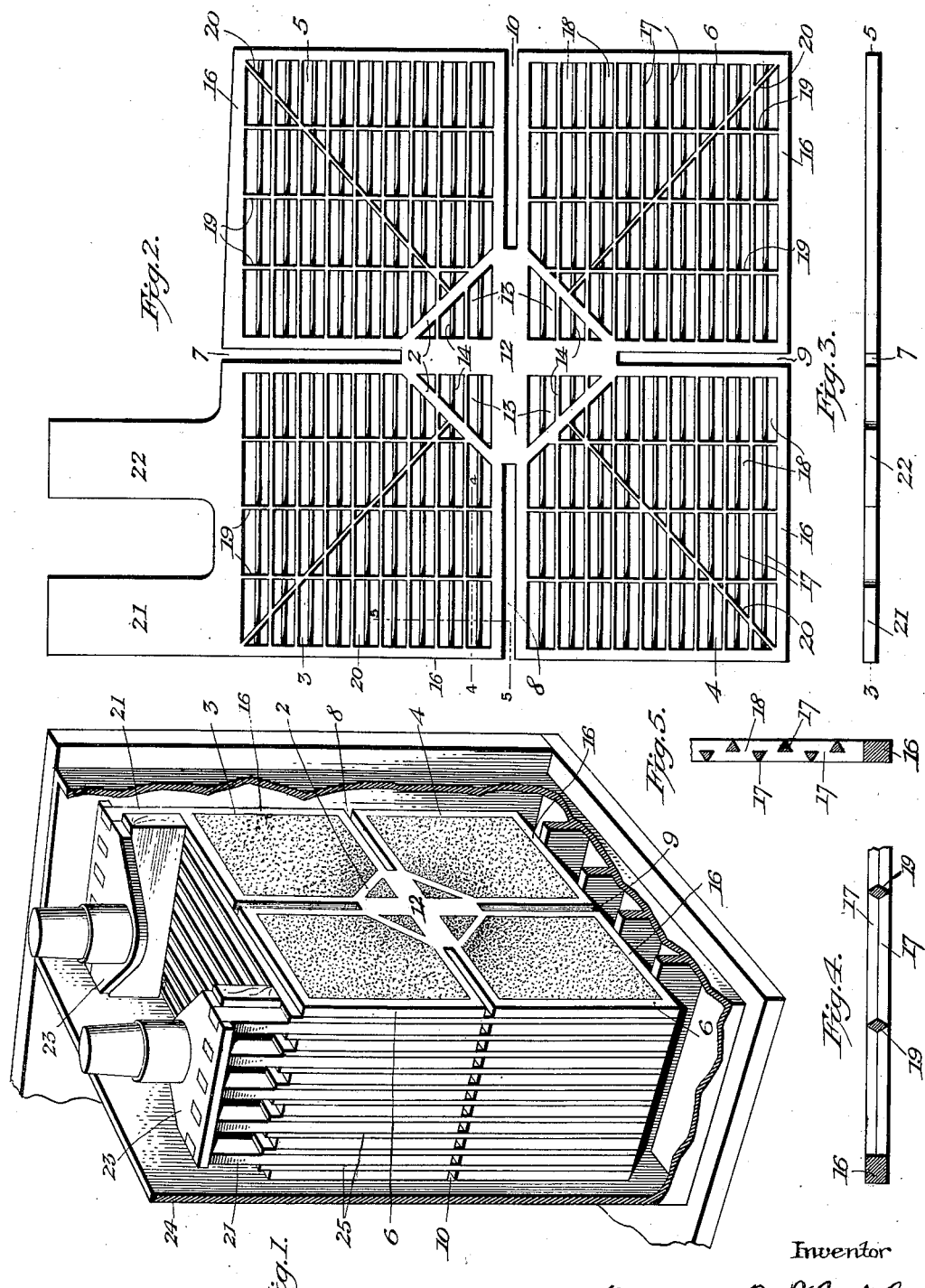
Inventor
Reason P. Shatzke
By
H. S. Bailey
Attorney Patented Apr. 10, 1923.

1,451,058

UNITED STATES PATENT OFFICE.

REASON P. SHATZKE, OF DENVER, COLORADO.

GRID PLATE FOR ELECTRIC-CURRENT STORAGE BATTERIES.

Application filed February 6, 1922. Serial No. 534,386.

*To all whom it may concern:*

Be it known that I, REASON P. SHATZKE, a citizen of the United States of America, residing at the city and county of Denver and State of Colorado, have invented new and useful Grid Plates for Electric-Current Storage Batteries, of which the following is a specification.

My invention relates to a new and improved grid-plate for electric current storage batteries.

And the objects of my invention are:

First: to provide a grid-plate for storage batteries, that is of such a novel form of construction and arrangement that it will not be buckled out of its normally perfectly flat form by the heat generated in the battery.

Second: to provide a grid-plate for storage batteries, that is constructed and arranged to allow for expansion and contraction movements, and that, if it slightly springs or twists or bends out of its perfectly flat normal form, will return instantly to its flat straight form and true shape.

Third: to provide a grid-plate for acid storage batteries in particular, that is constructed and arranged into a number of separate units that are integrally assembled together into the form of a square plate and are integrally connected together at their inner corners by a supporting rectangular frame member.

I attain these objects by the mechanism illustrated in the accompanying drawings, in which:

Figure 1 is a perspective view of a battery cell equipped with grids or plates, constructed in accordance with my invention, one side and one end of the cell being broken away to display the said plates.

Fig. 2 is a side view of one of the improved grids.

Fig. 3 is a plan view of the same.

Figs. 4 and 5 are enlarged sectional views on lines 4—4 and 5—5 respectively, of Figure 2.

Similar letters of reference refer to similar parts throughout the several views.

Referring to the drawings:

The numeral 1 designates a grid-plate embodying my invention.

My improved grid-plate 1 consists of a one piece plate, and when cast or otherwise formed, is composed of independent unit members connected together by one center member 2, and as illustrated, it is composed of free corner unit members 3, 4, 5 and 6, four preferably being shown, and they form the plate, and they are separated from each other by four diametrically arranged and radially positioned spaces 7, 8, 9 and 10, that are about an eighth of an inch wide and that are formed between the inner opposing side edges of the four units to the solid center core or connecting member 2, which is of the same thickness as the surrounding border edges of each of the four units that compose the grid, and is cast or otherwise formed integrally with the four separated corner units.

The center core 2 may be of any form desired, but I preferably make it of square outline at its border edges but the center is preferably in the form of a cross 12, and there are open spaces 13 between this center cross portion and its border, across which paste supporting and clinching ribs 14 extend, the spaces between which are of a width relative to the thickness and shape of the ribs, to clinch and hold the paste that is pressed in the spaces around and between them.

My grid-plate is made of lead, and its thickness is of such a proportional part of, or is so related to its side area that it will not be warped by the heat generated in the battery. I have in practice found that this thickness is proportionally about one-eighth of an inch for the area of the separate plates which make up the whole grid.

The border edges 16 of the four corner units and of the center core form an enclosing frame for defining the outside edges of the grid-plate and its core, and at the same time an abutment for the paste, and it is the same on both sides of the entire grid-plate.

The entire surface of the four partially separated units of the grid-plate is provided with alternately arranged ribs 17 that are separated from each other by spaces 18, and the spaces 18 are preferably a trifle wider than the ribs.

These ribs are preferably made of V-shape, and the narrow or sharpest edge of all those on each opposite side of the grid-plate is even with the surface of the border edges of each square corner unit of the complete grid-plate, and the border edges of their center core and their V-shaped ribs extend from flush with the border edges of the opposite sides of the gride-plate, to, or about to the center of the thickness of the grid-plate, and they consequently form substantially opposingly arranged partitions that effectually lock, with a weaving action, the paste that is pressed into the spaces from the opposite sides of the corner units of the grid-plate and the spaces in its center core portion, to them.

At suitable predetermined distances apart across the four units of the grid-plates, I cast or otherwise form cross ribs 19 and I also provide each of them with a diagonal rib 20 that extends from their outer corners to the center square or frame of the grid-plate. These ribs 19 and 20 are strengthening and stiffening ribs, but their main function is to conduct the current from each separate grid section to the center member which connects the several grid sections. They are of the same thickness as the border edges of the corner plate and are wedge shape with their sharpest edges outward, but they extend entirely through the thickness of the corner units of the grid, and their thickest part is at the center of the thickness of the complete grid-plate. My separated corner units of the grid-plate form a perfectly flat smooth integral plate of a thin and even thickness throughout their entire surface.

I preferably arrange the paste holding and retaining ribs which are made and adapted to receive, hold and retain an electric current absorbing paste, such as oxide of lead mixed with suitable materials, longitudinally of the grid-plate, and I arrange the ribs 19 at right angles to them at equal distances apart, and I preferably illustrate four vertical ribs 19 in each corner unit or member of the grid-plate, and at the upper left hand corner of the grid-plate, I cast two vertical lugs 21 and 22 at a short distance apart. These lugs are used to secure the grid-plates in their operative position to the top cross bars 23 of the battery boxes 24 (see Figure 1), between the separating plates 25, which may be of wood or of any other suitable material.

Only one of these lugs is used in a battery box, but some battery boxes require that the cross bars 23 be connected to the outside lug 21, and others to the inside lug 22; therefore the lug not required may be severed from the grid.

My four separated corner membered centrally connected battery grid-plate is simple in construction, thoroughly practical, and will last as long as a battery and it will permanently retain its normally true flat shape and will expand and contract under all of the conditions that grid-plates are subjected to in batteries that are used in automobiles where extreme heat is frequently generated, resulting in the warping and buckling of the plates and the consequent shorting of the cell, in grids of the ordinary construction.

The cross 12 serves as a conducting medium to conduct the current from three of the grid units to the unit having the lug which is connected to the cross bar 23.

Having described my invention, what I claim as new and desire to secure by Letters Patent, is:

1. A grid-plate, consisting of a thin square plate divided into four corner portions that are separated from each other by quarterly arranged radiating spaces, and that have a center stiffening member, and diagonally arranged ribs extending from said center member to the corners of said plate.

2. A square grid-plate, comprising a plate divided by slots into four separated and independent grid members, but joined at their inner meeting corners by a central square-shaped joining member, the corners of which are arranged to project into their inner corner portions, said square joining portion being arranged to strengthen and stiffen said divided grid members to form of them a single piece integral grid-plate, said grid-plate being provided with bordering edges, and with its surface on both sides provided with open spaces, and containing rib members arranged to receive and retain within the border edges of said grid-plate, any suitable electric current absorbing paste.

3. In a grid-plate for storage batteries, a plate consisting of independently formed and separated grid members connected together at their corner portions into a single piece grid-plate, said independent members having a solid bordering edge, and a central portion having a solid center and a bordering edge, with ribs extending from its border edge to its solid center, and paste receiving apertures through said central portion between its ribs, each of said separated grid members comprising independent flat grid-plate portions through the greater part of their surface, and means including a central core portion integrally formed with their inner end portions and arranged to form them into a flat one piece grid-plate that is adapted and arranged to receive and retain any suitable electric current absorbing paste, and two independent supporting lugs on one border edge of said grid-plate, arranged and adapted to allow said grid-plate to be secured in batteries of different constructions.

4. A storage battery grid, comprising a center unit and four outer units which are connected at their inner corner portions to the center unit, a space being left between the opposing edges of each two outer units, one of said outer units having an integral upright lug.

5. A battery plate, comprising a central frame-like unit and four rectangular outer units grouped about the center unit to form a rectangular structure, the outer units being integrally connected to the center unit at their inner corner portions, a space being formed between each two outer units extending from the center unit to the margin of the plate, and an integral upright lug on one of the outer units.

6. A battery plate, comprising a central rectangular frame-like unit enclosing an integral cross, and four rectangular outer units which are arranged around the center unit to form a rectangular plate, the outer units being integrally connected to the central unit at their inner corner portions, a space being left between each two outer units extending from the center unit to the margin of the plate, diagonal ribs extending from the center frame-like unit to the diagonally opposite corners of the outer units, vertical and horizontal spaced ribs in each outer unit, and an upright integral lug on one of said outer units.

In testimony whereof I affix my signature in presence of two witnesses.

REASON P. SHATZKE.

Witnesses:
G. SARGENT ELLIOTT,
ELIZABETH SMITH.